CODE CONVERTING ELECTRICAL NETWORK

Filed July 14, 1955

2 Sheets-Sheet 1

INVENTOR.
WALTER S. CHAMBERLIN

BY

Christie, Parker & Hale
ATTORNEYS

CODE CONVERTING ELECTRICAL NETWORK

Filed July 14, 1955 2 Sheets-Sheet 2

INVENTOR.
WALTER S. CHAMBERLIN
BY
Christie, Parker & Hale
ATTORNEYS

United States Patent Office 2,972,135

Patented Feb. 14, 1961

2,972,135

CODE CONVERTING ELECTRICAL NETWORK

Walter S. Chamberlin, Pasadena, Calif., assignor, by mesne assignments, to Burroughs Corporation, Detroit, Mich., a corporation of Michigan

Filed July 14, 1955, Ser. No. 522,076

7 Claims. (Cl. 340—347)

This invention relates to electrical networks and more particularly to switch operated electrical networks for generating electrical signals of one code from digital representations of another code.

In digital computers as well as in data processing equipment generally, numerical information may be handled by means of electrical signals which are coded in accordance with digital values. For example, binary coded signals are frequently generated to represent digital values. Where digital values are handled by means of binary coded signals, the apparatus may be considerably simplified over that which would be required to handle signals coded in conventional 0–9 decimal notation.

However, binary coded information is generally difficult for an operator to use directly, due to the unfamiliarity of most persons with any code other than decimal notation. Therefore, in entering numerical information in a data processing system, it is desirable to provide a code converter for receiving digital representations of numbers in a first code, such as decimal notation, and converting the information to provide signals in a second code, such as binary code.

In accordance with the present invention there is provided new and improved apparatus for generating electrical signals in a desired code in accordance with digital representations of another code. In one embodiment of the invention, circuit connection devices, each of which has a normally closed circuit and a normally open circuit, are interconnected to generate coded output signals. In addition, the normally open circuits of the circuit connection devices are connected to generate a signal whenever one of the circuit connection devices is actuated. Thus, by actuating a circuit connection device, there may be provided output signals in accordance with a desired code and a signal indicating that a circuit connection device has been actuated. The signal which is generated from the normally open circuits of the circuit connection devices may be applied to gates which are connected to the output circuits in which the coded electrical signals appear to provide output signals in the form of coded sets of electrical impulses.

The circuit connection devices of the present invention may form a part of a keyboard in which each key actuates a given one of the circuit connection devices. It is contemplated that the present invention may be used to advantage where it is desired to enter binary coded signals in data processing equipment such as a digital computer by means of a keyboard having keys which correspond to decimal notation. By means of such a keyboard, an operator may enter information directly from decimal notation as in entering numbers in an adding machine or calculator with the apparatus of the present invention automatically providing coded electrical impulses to the data processing apparatus.

A better understanding of the operation and advantages of the present invention may be had upon a reading of the following detailed description in connection with the drawings, in which.

Figure 1:
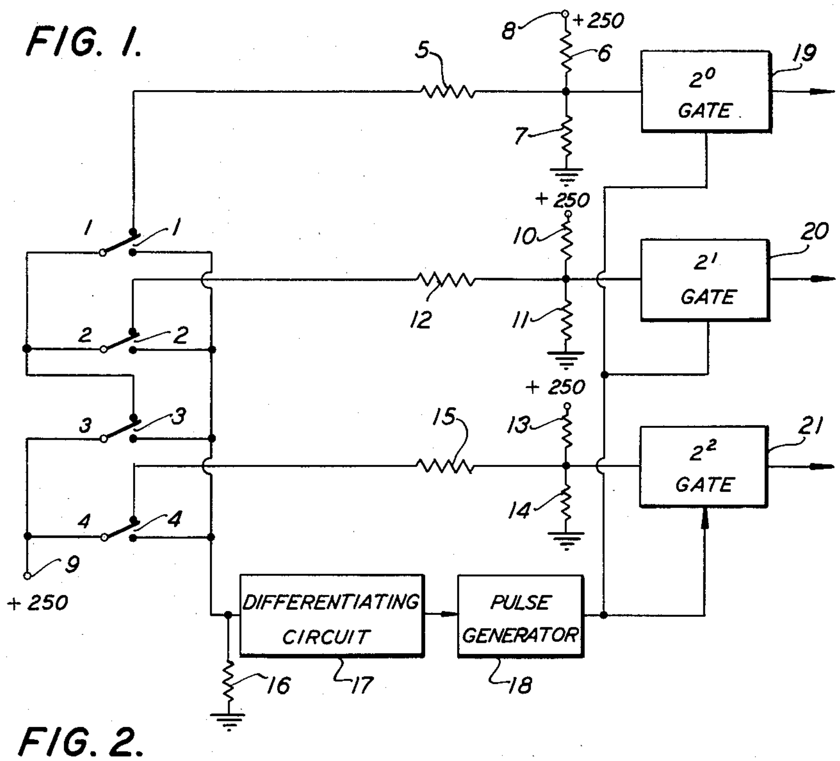
Fig. 1 is a combination block and schematic circuit diagram of an embodiment of the invention for providing binary coded electrical signals in accordance with a four digit input code.

The apparatus of Fig. 1 includes four circuit connection devices 1, 2, 3 and 4, each of which includes a normally closed circuit and a normally open circuit which may be operated from a keyboard.

When the circuit connection device 1 is actuated, the normally closed circuit is opened and the normally open circuit is closed. Connected serially with the normally closed circuit is a network comprising the resistors 5, 6 and 7. Before the circuit connection device is actuated, the potential at the junction point between the resistors 6 and 7 is determined by the current flowing through the resistors 6 and 7 from a terminal 8, and the current flowing through the resistors 5 and 7 from a terminal 9. The terminals 8 and 9 are adapted to be connected to a suitable source of potential (not shown). However, when the circuit connection device 1 is actuated, the terminal 9 is disconnected from the resistor 5 and the potential at the junction point between the resistors 6 and 7 is determined solely by the current flowing from the terminal 8 through the resistors 6 and 7. This means that when the circuit connection device 1 is actuated, less current flows through the resistor 7, the voltage drop across the resistor 7 is less, and the potential at the junction point of the resistors 6 and 7 decreases.

In like manner, actuation of the circuit connection device 2 causes the potential appearing at the junction point between a pair of resistors 10 and 11 to vary by interrupting the current flow from the terminal 9 through a resistor 12 and the resistor 11. Therefore, when the circuit connection device 2 is actuated the potential at the junction point between the resistors 10 and 11 will be relatively low.

Connected serially with the circuit connection devices 1 and 2 is a circuit connection device 3, which when actuated, causes the junction point between the resistors 6 and 7 and the junction point between the resistors 10 and 11 to assume a relatively low potential.

When the circuit connection device 4 is actuated, the junction point between a pair of resistors 13 and 14 assumes a relatively low potential, while the junction points between the resistors 6 and 7 and the resistors 10 and 11 remain at a relatively high potential.

In order to generate a signal when one of the circuit connection devices 1, 2, 3 and 4 is actuated, a resistor 16 is connected to the normally open circuits of all of the circuit connection devices 1, 2, 3 and 4 via a common connection. When none of the circuit connection devices 1, 2, 3 and 4 are actuated, no current flows through the resistor 16. However, when one of the circuit connection devices is actuated, current flows from the terminal 9 through the resistor 16, and a voltage appears across the resistor 16. The rise in potential across the resistor 16 may be differential by means of a conventional differentiating circuit 17 to obtain a sharp pulse which is applied to a pulse generator 18. A suitable differentiating circuit is described in the Radiation Laboratory Series, vol. 19, page 649, published by McGraw-Hill, 1949.

In apparatus in which it is desired to provide coded electrical impulses corresponding to a digital representation, the gates 19, 20 and 21 may be connected to the junction points between the resistors 6 and 7, 10 and 11, and 13 and 14, respectively. It will be noted that the actuation of any one of the circuit connection devices 1, 2, 3 and 4 first generates the coded voltages at the junction points and next generates the gating signal due to the fact that a small interval elapses between the time that the circuit connection device opens the normally closed circuit and closes the normally open circuit. Therefore, the potential levels of the junction points are applied to the gates 19, 20 and 21 a short interval before the gating signal appears.

As is well known, any rapid change in condition in an electrical network produces a temporary transient condition in which the signals appearing in the electrical network are somewhat unstable. In the case of data processing equipment and digital computers, it is essential that provision be made to prevent the signals appearing during the transient interval from affecting the operation of the apparatus. However, by opening the gates 19, 20 and 21 a short interval after the coded signals are established at the junction points between the resistors, the output impulses passed by the gates 19, 20 and 21 are free from spurious transient signals which would otherwise be present.

Figure 2:
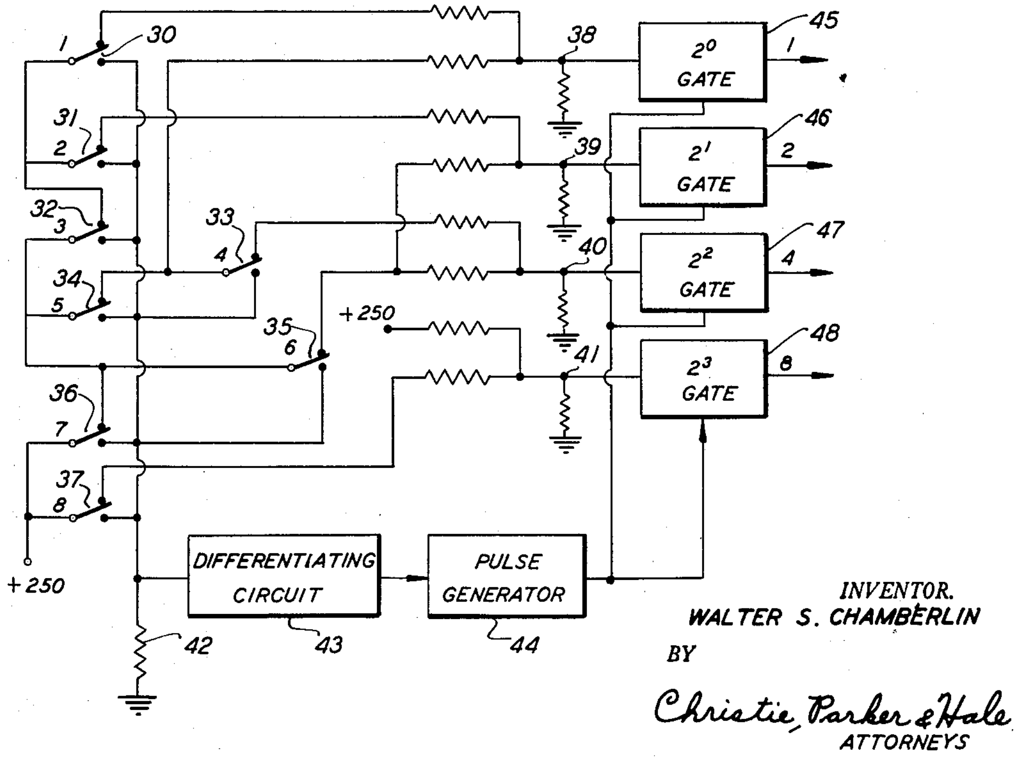
Fig. 2 is a combination block and schematic circuit diagram of apparatus for providing binary coded electrical signals in accordance with an eight digit input code.

In Fig. 2 there is shown apparatus which is adapted to generate binary coded signals in accordance with an eight digit input code. The apparatus of Fig. 2 includes eight circuit connection devices 30–37, the first three of which, 30, 31 and 32, are connected in a manner similar to that described above with respect to Fig. 1. The apparatus of Fig. 2 is arranged to provide relatively high potentials to relatively low potentials at the junction points 38, 39, 40 and 41 which represent binary coded digits.

When the circuit connection device 30 of Fig. 2 is actuated, the potential at the common junction point 38 assumes a relatively low potential corresponding to a binary representation of the numeral one. When the circuit connection device 31 is actuated, the potential at the common junction point 39 assumes a relatively low potential corresponding to a binary representation of the numeral two. As in the case of the apparatus of Fig. 1, when the circuit connection device 32 is actuated, the junction point 38 and the junction point 39 both assume a relatively low potential, corresponding to a binary representation of the numeral three, i.e. one plus two. When the circuit connection device 33 is energized, the junction 40 assumes a relatively low potential corresponding to a binary representation of the numeral four, and when the circuit connection device 34 is actuated, both the junction 38 and the junction 40 assume a relatively low potential, corresponding to a binary representation of the numeral five, i.e. one plus four.

When the circuit connection device 35 is actuated, the junctions 40 and 39 assume a relatively low potential corresponding to a binary representation of the numeral six, i.e. two plus four. The circuit connection device 36 corresponds to the decimal number seven, and when actuated, causes the junctions 38, 39 and 40 to assume a relatively low potential which corresponds in binary coding to the number seven, i.e. one plus two plus four.

Since the maximum number of permutations with three binary digits is seven, it is necessary to provide an additional output signal for numbers in excess of seven. Therefore, in the apparatus of Fig. 2, the potential of the junction 41 indicates the presence of a binary eight. Thus, the circuit connection device 37 may be actuated for the number eight, and the junction 41 will assume a relatively low potential.

In a manner similar to that described with reference to Fig. 1, a signal may be generated when one of the circuit connection devices of Fig. 2 is actuated, by means of a common connection with the normally open contacts of the circuit connection devices 30–37. Thus, whenever one of the circuit connection devices 30–37 is actuated, the potential appearing across the resistor 42 is differentiated by a differentiating circuit 43, and applied to a pulse generator 44. The output of the pulse generator 44 may be applied to a plurality of gates 45–48 whereby a set of binary coded electrical impulses is passed corresponding to the decimal digit registered by the circuit connection devices.

Figure 3:
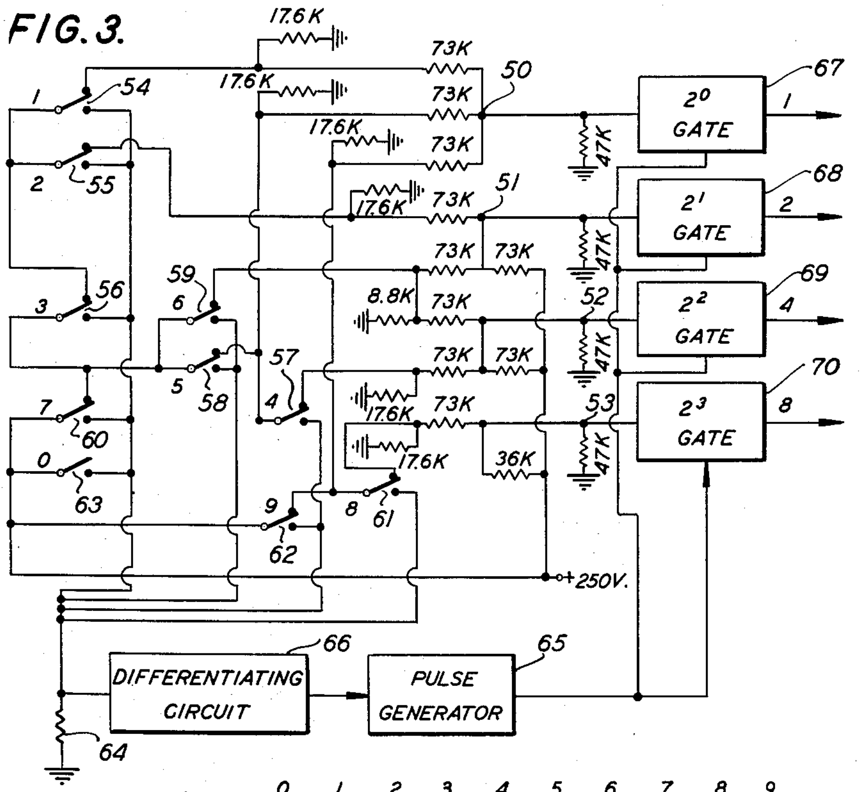
Fig. 3 is a combination block and schematic circuit diagram of apparatus for providing binary coded electrical signals in accordance with a ten digit input code.

In Fig. 3 there is shown apparatus for generating binary coded signals corresponding to a ten digit code. In operation, the apparatus of Fig. 3 is similar to the apparatus previously described in that the potentials at the junction points are binary coded in accordance with the actuation of selected ones of the circuit connection devices 54–63. Since there are ten circuit connection devices in Fig. 3, the apparatus may be used in connection with a conventional keyboard to generate binary coded output signals.

Figure 4:
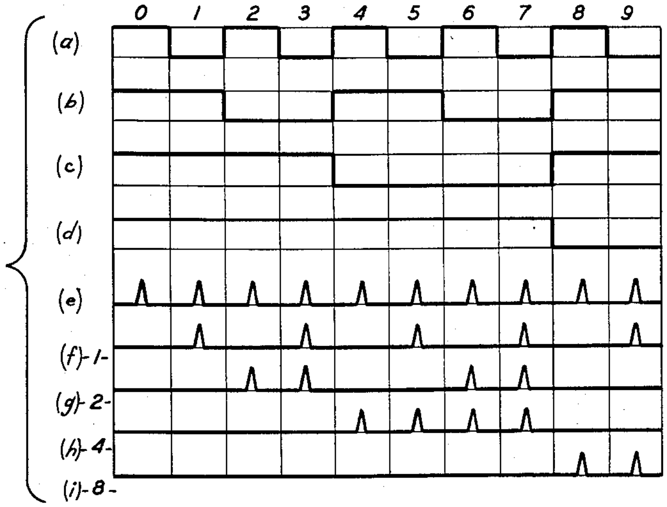
Fig. 4 is a graphical illustration showing the relationship between various electrical signals appearing in the apparatus of Fig. 3.

The graphical illustrations of Fig. 4 show the relationship between the potentials and signals appearing in the apparatus of Fig. 3 for each of the decimal digits 0–9.

When one of the circuit connection devices 54–63 is actuated, the voltage appearing across a resistor 64 is applied to a pulse generator 65 via a differentiating circuit 49. The output of the pulse generator is applied to the gates 67–70 which are primed by the binary coded voltages appearing at the junction points 50–53. In accordance with the circuit connection device which is actuated, the gates 67–70 are enabled to pass coded pulses as indicated in Fig. 4.

Fig. 4(*a*) illustrates the potential at the junction point 50 for each of the digits 0–9. It will be noted that the potential at the junction point 50 is low for odd numbered digits. The pulses passed by the gate 67 which is controlled by the junction point 50 are shown in Fig. 4(*f*) where it will be seen that the pulses from the pulse generator 65 are passed by the gate 67 for odd numbered decimal digits.

The potential at the junction point 51 is illustrated in Fig. 4(*b*), and the pulses passed by the gate 68, which is controlled by the potential appearing at the junction point 51, are shown in Fig. 4(*g*).

In like manner, Fig. 4(*c*) shows the potential at the junction point 52 for each of the decimal digits 0–9, and Fig. 4(*h*) illustrates the pulses passed by the gate 69 in response to the potential at the junction point 52.

Fig. 4(*d*) shows the potential appearing at the junction point 53 for each of the decimal digits 0–9, and Fig. 4(*i*) shows the corresponding pulses passed by the gate 70.

Referring to Figs. 4(*e*)–(*i*), it will be seen that pulses are passed by the gates 67, 68, 69 and 70 in accordance with conventional binary code. As noted previously, the pulses of Figs. 4(*e*)–(*i*) are slightly delayed due to the inherent action of the circuit connection devices 54–63. Consequently, the pulses of Fig. 4(*e*) are applied to the gates 67–70 after the potentials of Figs. 4(*a*)–(*d*) are established, thereby substantially eliminating any spurious transient signals which otherwise might appear at the outputs of the gates 67–70.

Although specific values for the resistors and voltages have been given for the embodiment of Fig. 3, it will be appreciated that these values are given by way of example, being indicative only of those which were employed in one workable embodiment. The values of the resistors are given in ohms where $k=1000$ and the values of the potentials are given in volts (v.).

In the various illustrative embodiments the circuit connection devices comprise conventional single pole double throw switches. However, it will be understood that any equivalent circuit connection device which includes a normally closed circuit path and a normally open circuit path may be used as well.

In addition, the apparatus may be modified to convert registrations from any given code to another without departing from the invention.

I claim:

1. A code converter, including in combination a plurality of circuit connection devices which are adapted to be actuated in accordance with a digital representation in a first code, each of said circuit connection devices including a normally closed circuit and a normally open circuit; a plurality of output gating circuits which are adapted to provide output signals in accordance with a second code; circuit means interconnecting the normally closed circuits of said circuit connection devices and said output circuits for opening selected gating circuits to provide output signals from said output circuits of said second code corresponding to the actuation of said circuit connection devices in accordance with said first code; means connected to the normally open circuits of all of said circuit connection devices for generating a signal pulse whenever one of said circuit connection devices is actuated; and means for coupling said signal pulse to each of the output gating circuits for producing output signals from the output gating circuits.

2. A code converter, including in combination a plurality of circuit connection devices which are adapted to be actuated in accordance with a digital representation in a first code, each of said circuit connection devices including a normally closed circuit and a normally open circuit; circuit means interconnecting the normally closed circuits of said circuit connection devices to provide a plurality of voltage levels in accordance with a second code corresponding to the actuation of said circuit connection devices; a plurality of normally closed gates connected to said circuit interconnecting means and actuated in response to said voltage levels; and a signal pulse generator connected between the normally open circuits of all of said circuit connection devices and said gates, whereby pulses are passed by said gates in said second code corresponding to the circuit connection device which is actuated in accordance with the digital representation of said first code.

3. Apparatus in accordance with claim 2 in which said gating signal generator comprises a differentiating circuit connected serially with an electrical impulse generator.

4. Apparatus for generating digital signals, including in combination a first gating circuit, a second gating circuit, a third gating circuit, a first pair of normally closed switch contacts connected serially with the first gating circuit, a second pair of normally closed switch contacts connected serially with the second gating circuit, a common connection between one of the first pair of normally closed contacts and one of the second pair of normally closed contacts, a third pair of normally closed switch contacts connected serially with said common connection, a fourth pair of normally closed switch contacts connected serially with the third gating circuit, said fourth pair of contacts and said third gating circuit being connected in parallel with said first, second and third pairs of normally closed contacts and said first and second gating circuits.

5. Apparatus in accordance with claim 4, in which a pair of normally open contacts is associated with each pair of normally closed contacts, a common output circuit connected serially with the normally open contacts of all of the switch contacts, a differentiating circuit coupled to the common connection, a pulse generator coupled to the differentiating circuit, and means coupling the pulse generator output to said first, said second and said third signal gating circuits.

6. A switch-controlled matrix for generating binary coded signals, comprising a plurality of gating circuits, means associated with each gating circuit including a resistive network for closing the associated gating circuit in response to an applied potential, a potential source, means including a first set of normally closed contacts and a second set of normally closed contacts connected in series for applying a potential from said source to the network associated with a first one of the gating circuits, and means including a third set of normally closed contacts and said second set of normally closed contacts connected in series for applying a potential from said source to the network associated with a second one of the gating circuits, whereby opening the first set of contacts opens the first gating circuit, opening the third set of contacts opens the second gating circuit, and opening the second set of contacts opens both the first and second gating circuits.

7. Apparatus in accordance with claim 6, in which each of said sets of normally closed contacts comprises a portion of a single pole double throw switch, including said normally closed contacts and a set of normally open contacts, a common connection between all of said sets of normally open contacts, a differentiating circuit connected to said common connection, and a pulse generator connected to said differentiating circuit, the output being coupled to each of said gating circuits, whereby an output pulse is provided from said pulse generator whenever any of said single pole double throw switches are activated to close said normally open contacts.

References Cited in the file of this patent

UNITED STATES PATENTS

| | | |
|---|---|---|
| 2,533,242 | Gridley | Dec. 12, 1950 |
| 2,570,716 | Rochester | Oct. 9, 1951 |
| 2,647,689 | Bowyer | Aug. 4, 1953 |
| 2,657,856 | Edwards | Nov. 3, 1953 |
| 2,667,633 | Mandel | Jan. 26, 1954 |
| 2,693,593 | Crosman | Nov. 2, 1954 |
| 2,708,267 | Weidenhammer | May 10, 1955 |
| 2,716,230 | Oliwa | Aug. 23, 1955 |
| 2,735,091 | Burkhart | Feb. 14, 1956 |
| 2,749,484 | Levitt | June 5, 1956 |
| 2,798,667 | Spielberg | July 9, 1957 |
| 2,805,374 | Frothingham | Sept. 3, 1957 |
| 2,808,984 | Marshall et al. | Oct. 8, 1957 |
| 2,856,256 | Carman | Oct. 14, 1958 |

OTHER REFERENCES

"Department of the Army Technical Manual," TM 11-672, October 1951.